US012561211B2

(12) United States Patent
Ghadge et al.

(10) Patent No.: US 12,561,211 B2
(45) Date of Patent: Feb. 24, 2026

(54) SYSTEM AND METHOD FOR DYNAMICALLY MANAGING DATA PROTECTION RECOVERY POINT OBJECTIVE SLA

(71) Applicant: Druva Inc., Santa Clara, CA (US)

(72) Inventors: Sandeep Ghadge, Maharashtra (IN); Stephen Manley, Livermore, CA (US)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 18/808,624

(22) Filed: Aug. 19, 2024

(65) Prior Publication Data

US 2026/0050522 A1 Feb. 19, 2026

(51) Int. Cl.
*G06F 11/14* (2006.01)
*G06F 11/1446* (2026.01)

(52) U.S. Cl.
CPC ...... *G06F 11/1461* (2013.01); *G06F 2201/80* (2013.01)

(58) Field of Classification Search
CPC .......................... G06F 11/1461; G06F 2201/80
See application file for complete search history.

(56) References Cited

U.S. PATENT DOCUMENTS

2016/0048408 A1* 2/2016 Madhu .................. H04L 47/783
718/1

2019/0158590 A1* 5/2019 Wigmore ............ G06F 11/1451
2021/0374012 A1* 12/2021 Calmon ................. G06N 20/00

* cited by examiner

*Primary Examiner* — Apu M Mofiz
*Assistant Examiner* — Cindy Nguyen
(74) *Attorney, Agent, or Firm* — IceMiller LLP

(57) ABSTRACT

The invention provides a dynamic data-backup scheduling system. The system includes a memory storing one or more processor-executable routines and a processor communicatively coupled to the memory. The processor is configured to execute one or more processor-executable routines to determine a dynamic backup schedule for one or more computing machines based upon data change patterns of the respective computing machines. The processor is further configured to access user inputs corresponding to data backup for the one or more computing machines. The user inputs comprise at least one of a tolerable data loss threshold, critical data type, file sensitivity data, and exceptions data time period information. The processor is further configured to create one or more service level agreement (SLA) configurations for data backup based on the user inputs. The processor is further configured to access historical data corresponding to one or more data backup cycles of the one or more computing machines. The historical data comprises one or more of time series changes, the addition and/or change of data information for pre-determined data sets, and corresponding file metadata of the data sets. The processor is further configured to implement one of the active and passive modes of data backup using the user inputs and the historical data. The processor is further configured to trigger a backup job for one or more computing machines based on a comparison between the SLA configurations and dynamic information received about data addition and/or data change of the computing machines in the active mode. The processor is further configured to trigger a backup job for one or more computing machines based on a comparison between the SLA configurations and historical time series change and/or addition of data of the computing machines in the passive mode.

11 Claims, 6 Drawing Sheets

SYSTEM AND METHOD FOR DYNAMICALLY MANAGING DATA PROTECTION RECOVERY POINT OBJECTIVE SLA

FIELD OF INVENTION

Embodiments of the present disclosure relate to data management and protection, and more particularly, to system and method for dynamic data backup scheduling.

BACKGROUND

In the realm of data management, ensuring the integrity and availability of data through regular backups is crucial for both individuals and organizations. The ever-increasing volume and variety of data, coupled with the dynamic nature of data creation, modification, and access, have made efficient data management and protection more challenging than ever. Traditional data backup systems often rely on static backup schedules, which may not align well with the actual data change patterns of the computing machines they protect. This misalignment may lead to inefficiencies, including the potential for significant data loss, unnecessary data redundancy, and suboptimal use of storage and processing resources.

For example, static backup schedules often fail to align with the varying rates at which data changes on various computing devices. As a result, some data may be backed up too frequently, leading to redundant data storage and wasted resources, while other data may not be backed up often enough, increasing the risk of data loss. Additionally, traditional systems lack the ability to dynamically adjust backup operations based on real-time data changes. This inability to adapt may result in backups that are not aligned with the actual data usage and modification patterns, leading to potential gaps in data protection.

Furthermore, static backup schedules may lead to inefficient use of network bandwidth, storage space, and computational power. Frequent backups of changing data may clog resources, while infrequent backups of critical and rapidly changing data can compromise data integrity and availability.

Many conventional backup systems provide limited options for user customization. However, users often may not be able to specify detailed preferences or requirements for data backup, such as tolerable data loss thresholds, critical data types, file sensitivity levels, and exception periods, resulting in a one-size-fits-all approach that may not meet specific user needs. To address these challenges, there is a need for an intuitive and flexible approach to data backup scheduling.

BRIEF DESCRIPTION

The following description is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a dynamic data-backup scheduling system is provided. The system includes a memory storing one or more processor-executable routines and a processor communicatively coupled to the memory. The processor is configured to execute one or more processor-executable routines to determine a dynamic backup schedule for one or more computing machines based upon data change patterns of the respective computing machines. The processor is further configured to access user inputs corresponding to data backup for the one or more computing machines. The user inputs comprise at least one of a tolerable data loss threshold, critical data type, file sensitivity data, and exceptions data time period information. The processor is further configured to create one or more service level agreement (SLA) configurations for data backup based on the user inputs. The processor is further configured to access historical data corresponding to one or more data backup cycles of the one or more computing machines. The historical data comprises one or more of time series changes, the addition and/or change of data information for pre-determined data sets, and corresponding file metadata of the data sets. The processor is further configured to implement one of the active and passive modes of data backup using the user inputs and the historical data. The processor is further configured to trigger a backup job for one or more computing machines based on a comparison between the SLA configurations and dynamic information received about data addition and/or data change of the computing machines in the active mode. The processor is further configured to trigger a backup job for one or more computing machines based on a comparison between the SLA configurations and historical time series change and/or addition of data of the computing machines in the passive mode.

According to another example embodiment, a dynamic data-backup scheduling system is provided. The system includes a service level agreement (SLA) module that is configured to receive user inputs to schedule data backup for a computing machine. The user inputs comprise at least one of a tolerable data loss threshold, critical data type, file sensitivity data, and exceptions data time period information. The service level agreement (SLA) module is further configured to create one or more (SLA) configurations for data backup based on the user inputs. The system further includes a data scanner that is configured to scan the computing machine to retrieve real-time information about data addition and/or data change to a file system of the computing machine. The system further includes a data protection agent that is configured to receive the real-time information about data addition and/or data change from the data scanner and to trigger a data backup/data restore operation for the computing machine based upon a comparison between the received information and the SLA configurations.

According to another example embodiment, a dynamic data-backup scheduling system is provided. The system includes a service level agreement (SLA) module that is configured to receive user inputs to schedule data backup for a computing machine. The user inputs comprise at least one of a tolerable data loss threshold, critical data type, file sensitivity data, and exceptions data time period information. The service level agreement (SLA) module is further configured to create one or more (SLA) configurations for data backup based on the user inputs. The system further includes a data scanner that is configured to scan the computing machine to retrieve real-time information about data addition and/or data change to a file system of the computing machine. The system further includes a change history repository that is configured to store historical data corresponding to one or more data backup cycles of the computing machine. The historical data comprises one or more of time series changes, the addition and/or change of data information for pre-determined data sets, and file metadata of the data sets. The system further includes a data protection agent that is configured to receive the real-time information about data addition and/or data change from the data scanner and to trigger a data backup/data restore operation for the computing machine based on a comparison between the SLA configurations and the historical data.

According to another example embodiment, a method of dynamic data-backup scheduling for one or more computing machines is disclosed. The method includes receiving user inputs corresponding to data backup for the one or more computing machines. The user inputs comprise at least one of a tolerable data loss threshold, critical data type, file sensitivity data, and exceptions data time period information. The method further includes generating one or more service level agreement (SLA) configurations for data backup based on the user inputs. The method further includes accessing historical data corresponding to one or more data backup cycles of the one or more computing machines. The historical data comprises one or more of time series changes, the addition and/or change of data information for pre-determined data sets, and file metadata of the data sets. The method further includes selecting one of the active and passive modes of data backup based upon the user inputs. The method further includes triggering a backup job for the one or more computing machines based on a comparison between the SLA configurations and dynamic information received about data addition and/or data change of the computing machines in the active mode. The method further includes triggering a backup job for the one or more computing machines based on a comparison between the SLA configurations and historical time series change and/or addition of data of the computing machines in the passive mode.

BRIEF DESCRIPTION OF THE DRAWINGS

The disclosure will be described and explained with additional specificity and detail with the accompanying figures in which.

DETAILED DESCRIPTION

Figure 1:
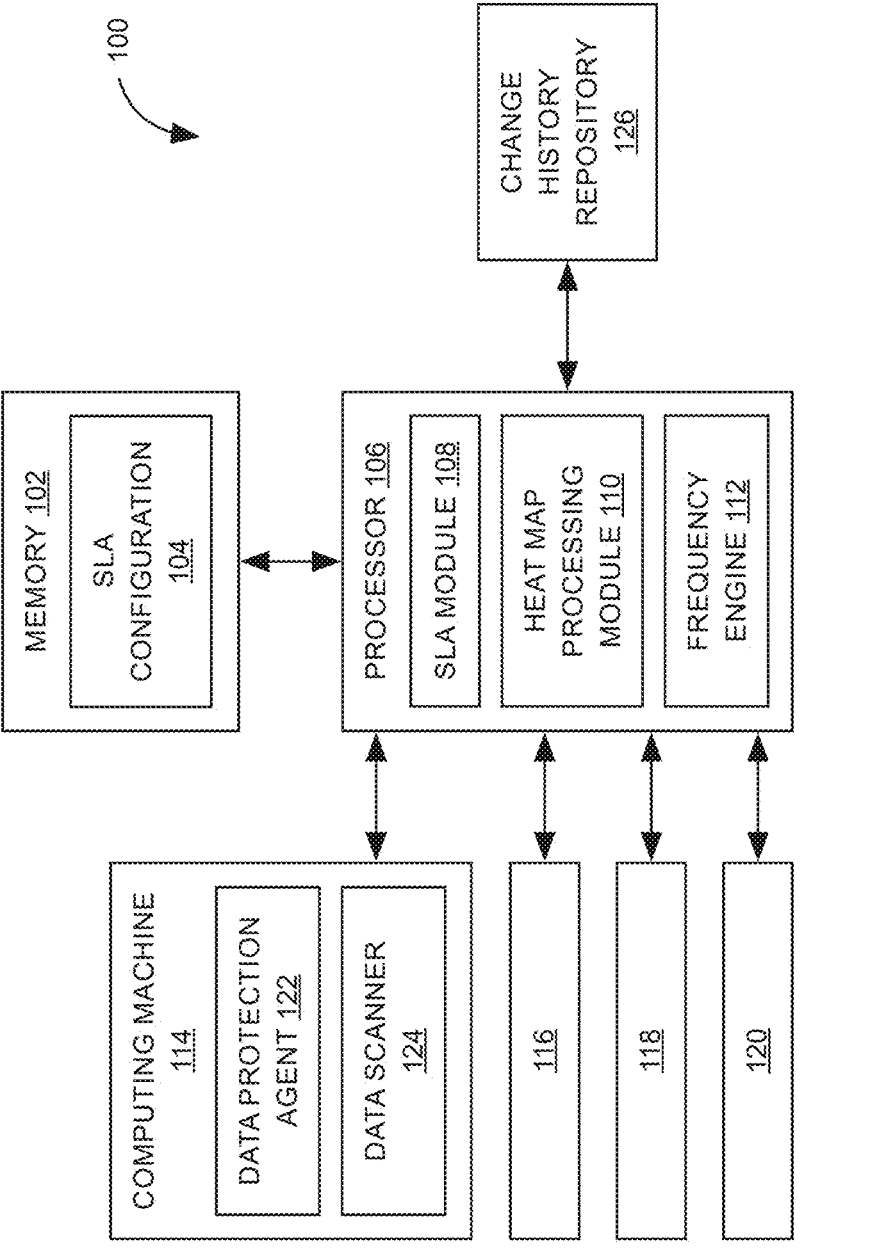
FIG. 1 is a block diagram illustrating components of a dynamic data-backup scheduling system, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed but may also have additional steps not included in the figures. It should also be noted that in some alternative implementations, the functions/acts/steps noted may occur out of the order noted in the figures. For example, two figures shown in succession may be executed substantially concurrently or may sometimes be executed in the reverse order, depending upon the functionality/acts involved.

Further, although the terms first, second, etc. may be used herein to describe various elements, components, regions, layers, and/or sections, it should be understood that these elements, components, regions, layers, and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between the first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

This section will describe an illustrative architecture for a dynamic data-backup scheduling system.

Embodiments of the invention provide a dynamic data-backup scheduling system designed to facilitate the management, execution, and automation of data backup operations. These embodiments address significant challenges of conventional data backup systems that often struggle with static schedules and inefficient resource utilization. The embodiments of the invention facilitate the creation of dynamic backup schedules that incorporate user-defined service level agreements (SLAs) and real-time data change patterns. This enables the system to adjust backup frequencies dynamically, ensuring data integrity and minimizing data loss. By leveraging historical data and real-time monitoring, users can easily configure, deploy, and manage their data backup processes, significantly enhancing the system's overall efficiency, scalability, and adaptability.

FIG. 1 is a block diagram 100 illustrating components of a dynamic data-backup scheduling system to implement some embodiments of the invention. The dynamic data-backup scheduling system 100 includes a memory 102, a processor 106 communicatively coupled to the memory 102. The memory 102 is configured to store one or more processor-executable routines The processor 106 is configured to execute the one or more processor-executable routines to determine a dynamic data backup schedule for computing machines, such as represented by reference numerals 114, 116, 118, and 120.

In the example embodiment, the processor 106 includes an SLA module 108, a heat map processing module 110, and a frequency engine 112. The processor 106 is configured to receive user inputs corresponding to data backup for the one or more computing machines 114, 116, 118, and 120 via the SLA module 108. Examples of user input include but are not limited to, a tolerable data loss threshold, critical data type, file sensitivity data, and exceptions data time period information. Based on the user inputs, the processor 106 is further configured to create one or more service level agreement (SLA) configurations 104 for data backup.

The processor 106 is further configured to access historical data corresponding to one or more data backup cycles of the computing machines such as 114 and build historical time series information related to data changed and data added for new data sets. In one example embodiment, the information about data addition and/or data change is available in a change history repository 126. In this example, historical data comprises one or more of time series changes, the addition and/or change of data information for predetermined data sets, and corresponding file metadata of the data sets.

In operation, the processor 106 is configured to implement an active mode or a passive mode of data backup using the user inputs and the historical data. In one embodiment, the processor 106 is configured to trigger a backup job for the computing machine 114 based on a comparison between the SLA configurations 104 and dynamic information received about data addition and/or data change of the computing machine 114 in the active mode. Alternatively, the processor 106 is configured to trigger a backup job for the computing machine 114 based on a comparison between the SLA configurations 104 and historical time series change and/or addition of data of the respective computing machine 114 in the passive mode.

In certain embodiments, the processor 106 is configured to automatically select between the active or passive modes of data backup based upon the availability of historical time series data. Moreover, the processor 106 is configured to switch between the active and passive modes of data backup based upon a user input.

In operation, the system 100 receives dynamic information about data addition and/or data change of the computing machine 114 over a pre-determined time period. Such time period may be configured by the user of the system 100. The dynamic information may include file metadata of the data that is added or changed for the computing machine 114.

The processor 106 is configured to build historical time series information related to data changed and data added for a new data set and to process this historical information and create a periodical heat map using the heat map processing module 110. The generated heat map represents the density of data and data added over a period of time. The processor 106 uses the generated heat map and the one or more SLA configurations 104 to determine a backup frequency using the frequency engine 112. Such backup frequency is utilized to trigger operations such as data scan, data backup, and data restore operations.

Each of the computing machines such as 114 includes a data protection agent 122 and a data scanner 124. The data protection agent 122 includes a remote agent installed on the computing machine 114 and is configured to receive real-time information about data addition and/or data change from the data scanner 124. The data scanner 116 is configured to scan the computing machine 114 to retrieve real-time information about data addition and/or data change to a file system of the computing machine 114. The data protection agent 122 is further configured to trigger a data backup/data restore operation for the computing machine 114 based on a comparison between the service level agreement (SLA) configurations 104 and the historical data. The operation of the data-backup scheduling system 100 in active and passive modes is described in further detail below with reference to FIGS. 2 and 3.

Figure 2:
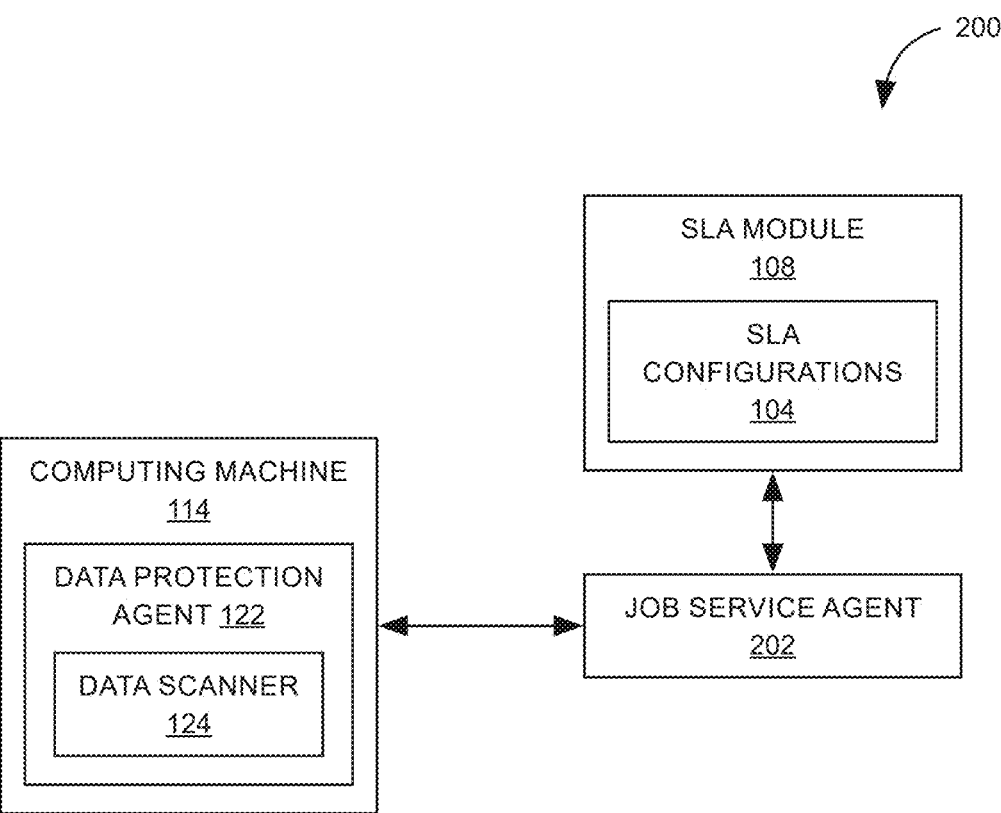
FIG. 2 is a block diagram illustrating an active mode of the dynamic data-backup scheduling system, according to some aspects of the present description.

FIG. 2 is a block diagram 200 illustrating an active mode of the dynamic data-backup scheduling system 100 of FIG. 1. As described, the dynamic data-backup scheduling system 100 is configured to switch between the active and passive modes of data backup based upon the user inputs provided in service level agreement (SLA) configurations 104. The dynamic data-backup scheduling system 100 is further configured to automatically select between the active or passive modes of data backup based upon the availability of historical time series data.

In the active mode, the SLA module 108 receives user inputs for scheduling data backups for the computing machine 114. The SLA module 108 may include an interface to provide user access and receive information related to their requirements for data backup processes. The user inputs may include elements essential for tailoring the backup strategy to meet specific organizational needs and priorities. The user inputs may comprise at least one of a tolerable data loss threshold, critical data type, file sensitivity data, and exceptions data time period information. The SLA module 108 is configured to create one or more service level agreement (SLA) configurations 104 for data backup based on the received user inputs. These configurations ensure that the backup processes are aligned with organizational requirements and priorities, thereby enhancing the reliability and effectiveness of the data protection strategy.

In this example, the dynamic data-backup scheduling system 100 also includes a job service agent 202. The job service agent 202 is configured to transmit the one or more service level agreement (SLA) configurations 104 and distribute them to the data protection agent 122 to initiate a backup operation on the computing machine 114 based on a pre-defined schedule, or based upon the comparison between the received information from the data scanner 124 and the service level agreement (SLA) configurations 104.

The data scanner 124 is configured to scan the computing machine 114 to retrieve real-time information about data addition and/or data change to a file system of the computing machine 114 and transmit such information to data protection agent 122. In this example, the data protection agent 122 is further configured to store information about changes to the file system with corresponding file metadata. The data protection agent 122 is further configured to trigger a data backup/data restore operation for the computing machine 114 based upon a comparison between the received information from the data scanner 124 and the service level agreement (SLA) configurations 104. The active mode of the dynamic data-backup scheduling system 100 leverages this service level agreement (SLA) configurations 104 to dynamically adjust the backup schedule and operations in real time, ensuring that data backups are performed in an efficient manner and in accordance with the defined SLAs.

Figure 3:
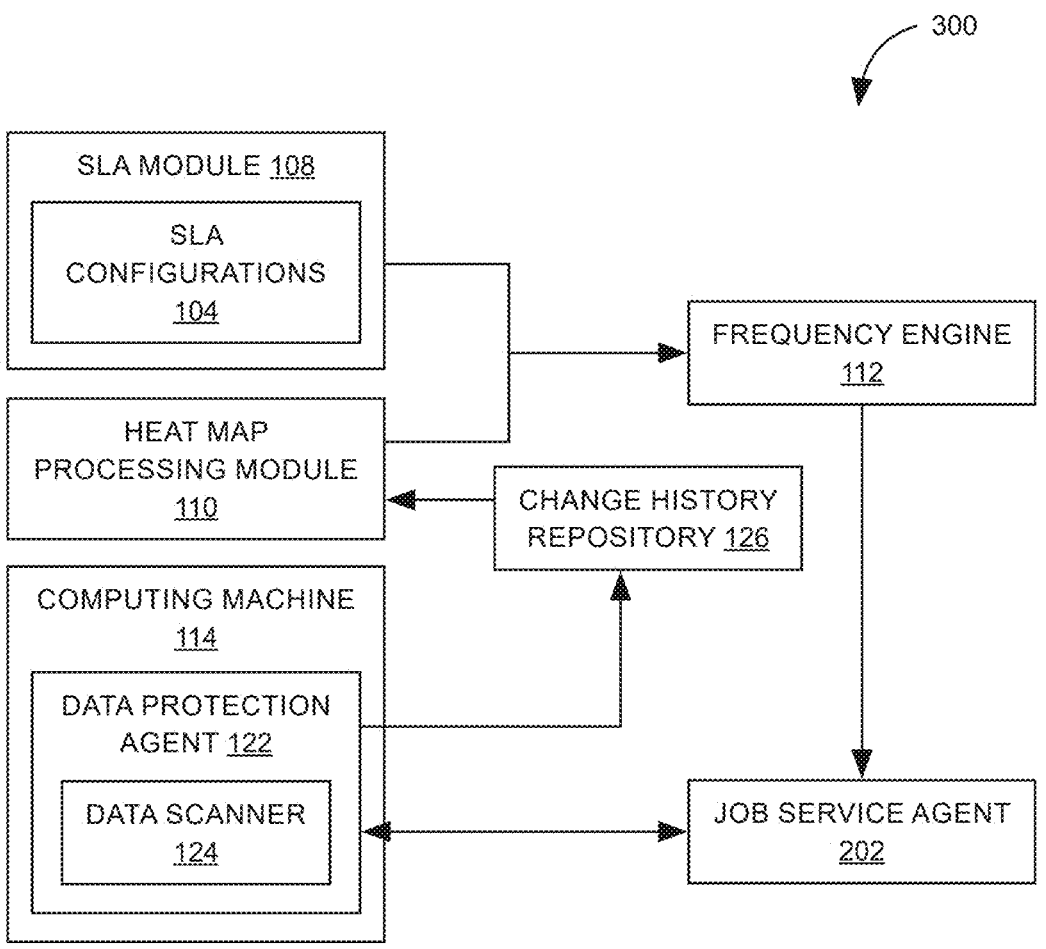
FIG. 3 is a block diagram illustrating a passive mode of the dynamic data-backup scheduling system, according to some aspects of the present description.

FIG. 3 is a block diagram 300 illustrating a passive mode of the dynamic data-backup scheduling system 100 of FIG. 1. As with the previous embodiment, in the passive mode, the SLA module 108 receives user inputs for scheduling data backups for the computing machine 114 and creates one or more service level agreement (SLA) configurations 104 for data backup based on the user inputs.

Moreover, the change history repository 12 is configured to store historical data of data addition and data change received from data scanner 124. Such data corresponds to one or more data backup cycles of the computing machine 114 and may include one or more of time series changes, the addition and/or change of data information for pre-determined data sets, and file metadata of the data sets.

The heat map processing module 110 is configured to access the change history repository 126 and to process the historical time series information related to data changed and data added for the new data set and/or an existing data set to generate a periodical heat map. The heat map is a representation of the density of data and data added over a period of time. The generated heat map may be stored in the change history repository 126. In addition, the frequency engine 112 determines a backup frequency based on the generated heat map and the one or more service level agreement (SLA) configurations 104.

In operation, the job service agent 202 is configured to transmit all the configurations to the data protection agent 122 to initiate a backup operation on one or more computing machines 114 based upon the comparison between the received information from the generated heat map and the service level agreement (SLA) configurations 104. The passive mode described here allows the dynamic data-backup scheduling system 100 to efficiently execute backup operations in accordance with historical insights, ensuring that data backups are performed in a timely and effective manner while adhering to the predefined SLAs.

Figure 4:
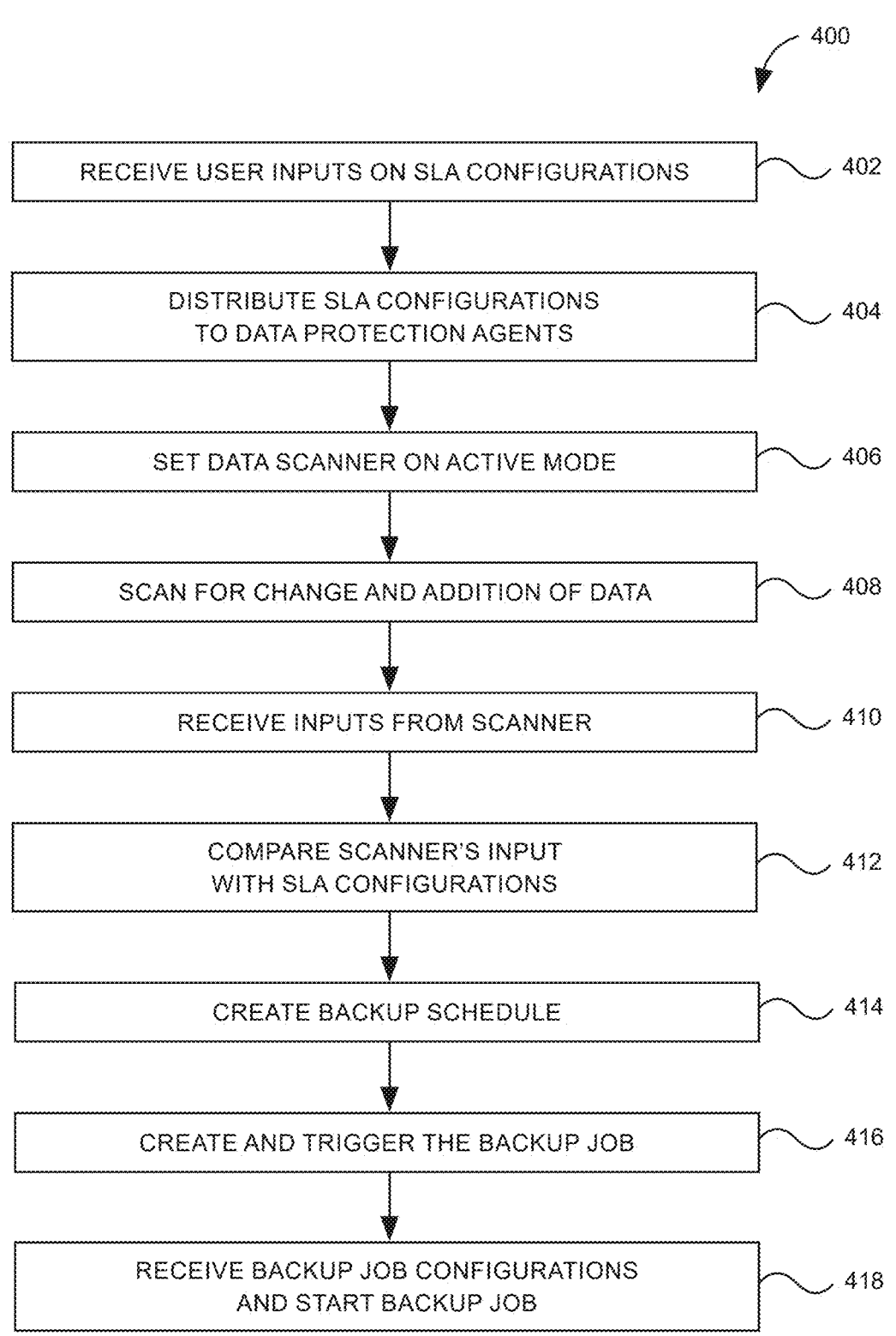
FIG. 4 illustrates a flow chart of the process of implementing the dynamic data-backup scheduling system in active mode.

FIG. 4 is a flowchart 400 illustrating the process of implementing the active mode using the dynamic data-backup scheduling system 100 of FIG. 1. At block 402, the system receives user inputs corresponding to the data backup for one or more computing machines and to generate the SLAs based on the user inputs. The user inputs include at least one of a tolerable data loss threshold, critical data type, file sensitivity data, and exceptions data time period information. The user inputs are processed to create detailed SLA configurations that define the parameters for data backup. The generated SLA configurations are then distributed to various data protection agents associated with the computing machines, ensuring that each agent operates according to the specific backup requirements defined by the user (block 404). Data protection agents may be installed on the remote computing machines.

At block 406, the data scanner is operated in active mode, allowing for real-time monitoring of data changes and additions on the computing machines. The data scanner continuously scans the file system for any modifications or new data entries, detecting changes, additions, and deletions of files while gathering corresponding file metadata (block 408). At block 410, the system receives inputs from the data scanner including detailed information about the data changes and additions detected, encompassing the type of change (addition, modification, deletion) and file metadata (e.g., timestamps, size, type).

The scanner inputs are then compared with the predefined SLA configurations to determine whether the detected changes comply with the conditions specified in the SLAs (block 412). Based on the comparison results, the system dynamically generates a backup schedule, prioritizing backups in accordance with the SLA requirements and the detected data changes (block 414). This schedule determines the frequency and timing of backup jobs to ensure data integrity and minimal data loss.

At block 416, the system creates specific backup jobs as per the dynamic schedule generated, configuring them with detailed instructions on details of data to be backed up, the backup frequency, and the backup destination. These backup jobs are triggered automatically by the system, ensuring timely data protection. At block 418, the data protection agents receive the detailed backup job configurations and initiate the backup process as specified, involving copying the identified data changes and additions to the designated backup storage. The system monitors the progress of the backup job to ensure successful execution, logging and reporting any errors or issues encountered. Upon completion, the system verifies the integrity of the backed-up data and updates the backup status, providing a robust and flexible solution for modern data backup needs.

Figure 5:
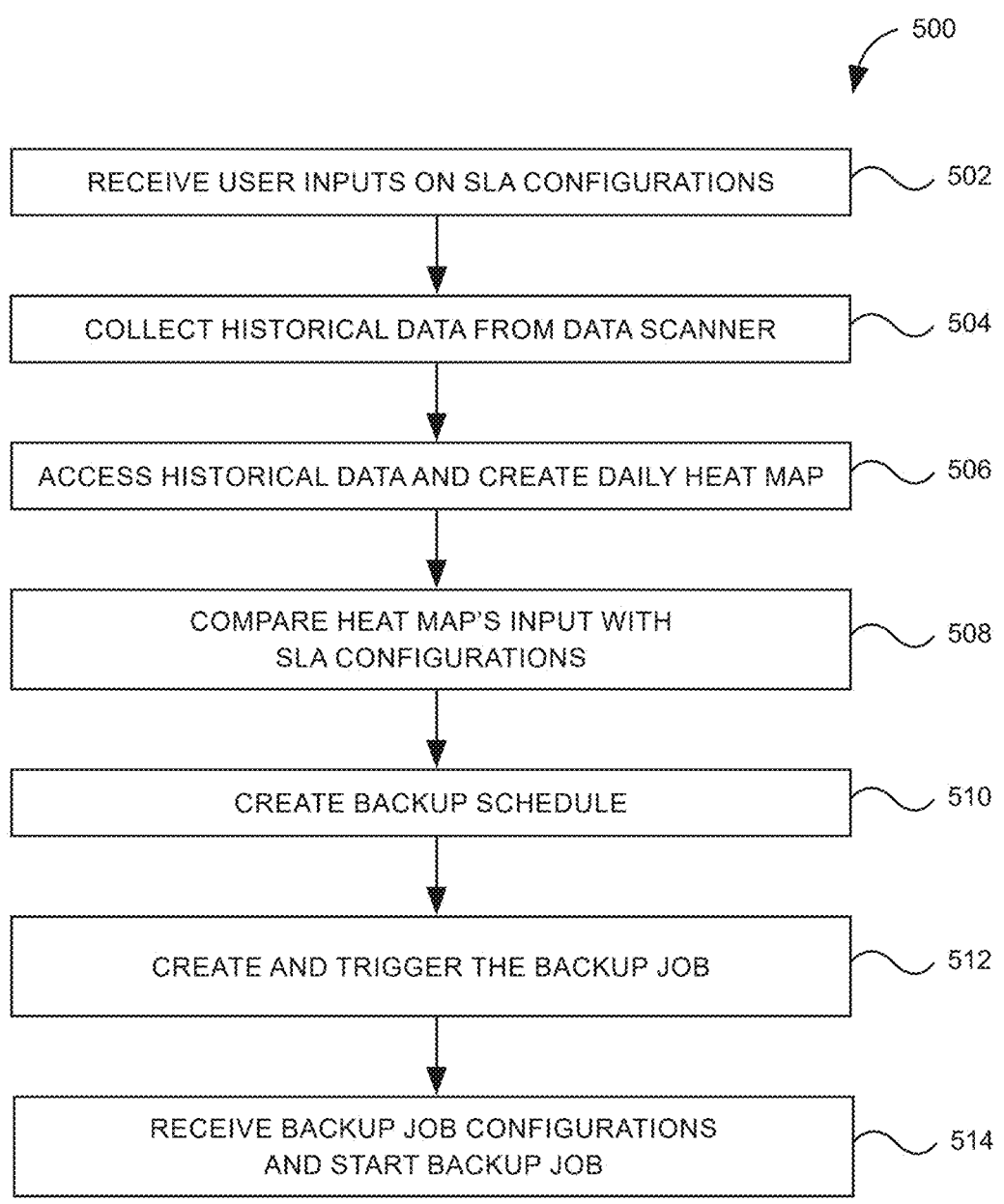
FIG. 5 illustrates a flow chart of the process of implementing the dynamic data-backup scheduling system in passive mode.

FIG. 5 is a flowchart 500 illustrating the process of implementing the passive mode using the dynamic data-backup scheduling system 100 of FIG. 1. At block 502, the system receives user inputs necessary for configuring SLAs, that include parameters such as tolerable data loss thresholds, critical data types, file sensitivity data, and exceptions data time period information. These user inputs are processed to generate detailed SLA configurations that define the specific requirements and conditions for data backup operations.

At 504, historical data from the data scanner is accessed. This involves retrieving records of data changes, additions, and deletions on the computing machines. The historical data includes time series changes, information about added or modified data, and corresponding file metadata. By accessing and analyzing this historical data, the system can identify patterns and trends in data activity over time.

Using the collected historical data, a daily heat map is created that visually represents the density and frequency of data changes and additions (block 506). The heat map provides a comprehensive overview of periods with high or low data activity, enabling the system to better understand the data usage patterns of the computing machines. The heat map's information is then compared with the predefined SLA configurations to ensure that the backup schedule aligns with the user-defined parameters, such as critical data types and tolerable data loss thresholds (block 508).

Based on this comparison, the system dynamically generates a backup schedule that prioritizes backup operations according to the SLA requirements and the insights gained from the heat map (block 510). This schedule determines the optimal frequency and timing for backup jobs, ensuring that data integrity is maintained and data loss is minimized during periods of high activity.

At block 512, the system creates specific backup jobs in accordance with the dynamically generated schedule. These backup jobs are configured with detailed instructions on what data to back up, the frequency of backups, and the destination for storing the backed-up data. The system automatically triggers these backup jobs, ensuring that they are executed in a timely manner.

Upon triggering, the backup job configurations are sent to the data protection agents, which then initiate the backup process as specified (block 514). The agents perform the necessary operations to copy the identified data changes and additions to the designated backup storage. The system monitors the progress of these backup jobs to ensure successful execution, logging any errors or issues that may arise during the process. Upon completion, the system verifies the integrity of the backed-up data and updates the backup status, thereby providing a robust and flexible solution for modern data backup needs.

Figure 6:
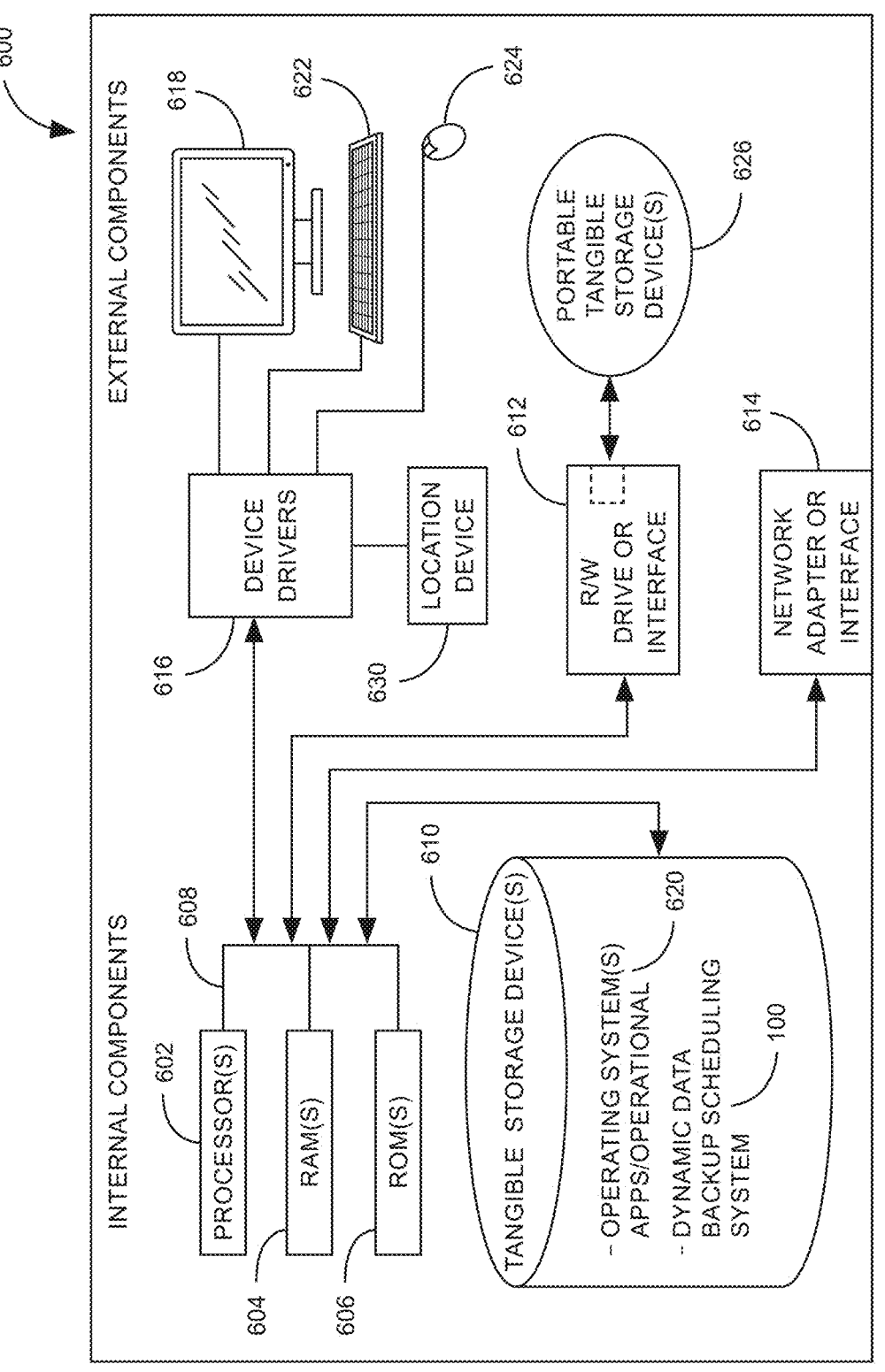
FIG. 6 is a block diagram of an embodiment of a computing device in which the dynamic data-backup scheduling system, described herein, is implemented.

The business process infrastructure modules of the dynamic data-backup scheduling system 100 described herein, are implemented in computing devices. One example of a computing device (600) is described below in FIG. 6. The computing device (600) includes one or more processor(s) (602), one or more computer-readable RAMs (604), and one or more computer-readable ROMs (606) on one or more buses (608). Further, the computing device (600) includes a tangible storage device (610) that may be used to execute operating systems (620) and the dynamic data-backup scheduling system (100). The various modules of the dynamic data-backup scheduling system (100) may be stored in the tangible storage device (610). Both, the operating systems (620) and the dynamic data-backup scheduling system (100) are executed by one or more processor(s)

(602) via one or more respective RAMs (604) (which typically include cache memory). The execution of the operating systems (620) and/or the dynamic data-backup scheduling system (100) by one or more processor(s) (602), configures the one or more processor(s) (602) as a special purpose processor configured to carry out the functionalities of the operation systems (620) and/or the dynamic data-backup scheduling system (100) as described above.

Examples of tangible storage devices (610) include semiconductor storage devices such as ROM, EPROM, flash memory, or any other computer-readable tangible storage device that may store a computer program and digital information.

The computing device (600) also includes an R/W drive or interface (614) to read from and write to one or more portable computer-readable tangible storage devices (628) such as a CD-ROM, DVD, memory stick, or semiconductor storage device. Further, network adapters or interfaces (612) such as TCP/IP adapter cards, wireless Wi-Fi interface cards, or 3G or 4G wireless interface cards, or other wired or wireless communication links are also included in computing devices.

In one example embodiment, the dynamic data-backup scheduling system (100) may be stored in the tangible storage device (610) and may be downloaded from an external computer via a network (for example, the Internet, a local area network, or other, wide area network) and network adapter or interface (612).

Computing device (600) further includes device drivers (616) to interface with input and output devices. The input and output devices may include a computer display monitor (618), a keyboard (622), a keypad, a touch screen, a computer mouse (624), and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or its uses. The broad teachings of the disclosure may be implemented in a variety of forms. Therefore, while this disclosure includes particular examples, the true scope of the disclosure should not be so limited since other modifications will become apparent upon a study of the drawings, and the specification. It should be understood that one or more steps within a method may be executed in different order (or concurrently) without altering the principles of the present disclosure. Further, although each of the example embodiments is described above as having certain features, any one or more of those features described with respect to an example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer-readable medium, and tangible computer program product. For example, the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple pl that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer device to perform any one of the aforementioned methods. Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device's main body or a removable medium arranged so that it may be separated from the computer device's main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include but are not limited to, rewriteable non-volatile memory devices (including, for example, flash memory devices, erasable programmable read-only memory devices, or mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc).

Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general-purpose computer to execute one or more particular functions embodied in computer programs. The functional blocks and flowchart elements described above serve as software specifications, which may be translated into computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PUP, Scala, Eiffel, Smalltalk, Erlang, Ruby, Flash®, Visual Basic®, Lua, and Python®.

What is claimed is:

1. A dynamic data-backup scheduling system comprising:
a memory storing one or more processor-executable routines; and
a processor communicatively coupled to the memory, the processor configured to execute the one or more processor-executable routines to one or more computing machines based upon data change patterns of the respective computing machines, wherein the processor is configured to:
access user inputs corresponding to data backup for the one or more computing machines, wherein the user inputs comprise at least one of a tolerable data loss threshold, critical data type, file sensitivity data, and exceptions data time period information;
create one or more service level agreement (SLA) configurations for data backup based on the user inputs;
access historical data corresponding to one or more data backup cycles of the one or more computing machines, wherein the historical data comprises one or more of time series changes, the addition and/or change of data information for pre-determined data sets, and corresponding file metadata of the data sets;
implement one of the active and passive modes of data backup using the user inputs and the historical data;
trigger a backup job for one or more computing machines based on a comparison between the SLA configurations and dynamic information received about data addition and/or data change of the computing machines in the active mode;
trigger a backup job for one or more computing machines based on a comparison between the SLA configurations and historical time series change and/or addition of data of the computing machines in the passive mode;
build historical time series information related to data changed and data added for a new data set; and
process the historical time series information related to data changed and data added for the new data set and/or an existing data set to create a periodical heat map, wherein the heat map comprises a representation of density of data and data added over a period of time.

2. The system of claim 1, wherein the processor is configured to automatically select between the active or passive modes of data backup based upon the availability of historical time series data.

3. The system of claim 2, wherein the processor is further configured to switch between the active and passive modes of data backup based upon user input.

4. The system of claim 1, wherein the processor is configured to receive dynamic information about data addition and/or data change of the computing machines over a pre-determined time period.

5. The system of claim 4, wherein dynamic information further comprises file metadata of the data that is added or changed for the computing machines.

6. The system of claim 1, wherein the processor is configured to determine a backup frequency for the respective computing machine using the heat map and the SLA configurations.

7. The system of claim 1, wherein the processor is further configured to initiate one of data scan, data backup, and data restore operations based on the dynamic backup schedule.

8. The system of claim 7, wherein the processor is further configured to initiate one of the data scan, data backup, and data restore operations based on a pre-determined static schedule.

9. A dynamic data-backup scheduling system comprising a memory, the memory storing one or more processor-executable routines, and a processor communicatively coupled to the memory, wherein the processor-executable routines cause the processor to perform operations comprising:

service level agreement (SLA) operations comprising receiving user inputs to schedule data backup for a computing machine, wherein the user inputs comprise at least one of a tolerable data loss threshold, critical data type, file sensitivity data, and exceptions data time period information and wherein the SLA module is configured to create one or more (SLA) configurations for data backup based on the user inputs;

data scanner operations comprising scanning the computing machine to retrieve real-time information about data addition and/or data change to a file system of the computing machine;

change history repository operations comprising storing historical data corresponding to one or more data backup cycles of the computing machine, wherein the historical data comprises one or more of time series changes, the addition and/or change of data information for pre-determined data sets, and file metadata of the data sets;

data protection agent operations comprising receiving the real-time information about data addition and/or data change from the data scanner and to trigger a data backup/data restore operation for the computing machine based on a comparison between the SLA configurations and the historical data;

heat map processing operations comprising processing process the historical time series information related to data changed and data added for the new data set and/or an existing data set to create a periodical heat map; and frequency engine operations comprising determining a backup frequency based on the generated heat map and the one or more SLA configurations, wherein the data protection agent is further configured to access time series change and/or addition of data of the computing machines from the change history repository.

10. The dynamic data-backup scheduling system of claim 9, wherein the heat map comprises a representation of density of data and data added over a period of time.

11. The dynamic data-backup scheduling system of claim 9, wherein the generated heat map is stored in the change history repository.

\* \* \* \* \*